United States Patent [19]

Kishi et al.

[11] Patent Number: 5,438,104
[45] Date of Patent: Aug. 1, 1995

[54] MALEIMIDE COMPOSITION, PREPREG AND FIBER-REINFORCED PLASTIC

[75] Inventors: Hajime Kishi; Masazumi Tokunoh; Nobuyuki Odagiri, all of Iyo, Japan

[73] Assignee: Toray Industries, Inc., Tokyo, Japan

[21] Appl. No.: 964,854

[22] Filed: Oct. 22, 1992

[30] Foreign Application Priority Data

Oct. 22, 1991 [JP] Japan .................. 3-274268

[51] Int. Cl.⁶ .............................................. C08L 79/08
[52] U.S. Cl. ................... 525/426; 525/436; 524/424; 524/514
[58] Field of Search ........... 525/426, 436; 524/514, 524/424

[56] References Cited

U.S. PATENT DOCUMENTS

| | | | |
|---|---|---|---|
| 4,100,140 | 7/1978 | Zahir | 526/90 |
| 4,939,214 | 7/1990 | Imai | 525/426 |
| 4,985,509 | 1/1991 | Matuura et al. | 525/426 |
| 5,112,924 | 5/1982 | Chu | 525/426 |
| 5,194,518 | 3/1993 | Shirai | 525/426 |

FOREIGN PATENT DOCUMENTS 0191726 10/1984 Japan.

Primary Examiner—James J. Seidleck
Assistant Examiner—I. Zemel
Attorney, Agent, or Firm—Fish & Richardson

[57] ABSTRACT

A maleimide resin composition which gives a cured plastic having high toughness, high elastic modulus, high thermal resistance, high thermal decomposition resistance, low water absorption and high solvent resistance, as well as a prepreg and a fiber-reinforced plastic having the maleimide resin composition of the present invention as a matrix resin is disclosed. The maleimide resin composition of the present invention comprises a maleimide resin [A]; and a polyimide resin [B] containing a recurring unit of the formula [I] and/or [II]:

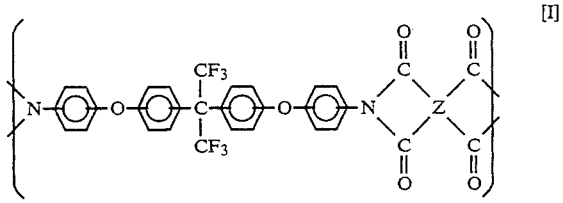

(wherein Z represents a tetracarboxylic acid dianhydride residue)

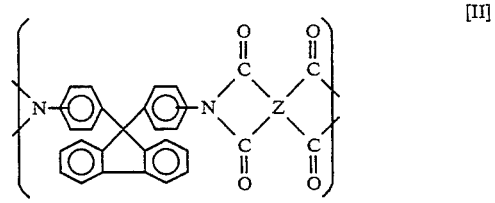

(wherein Z represents the same meaning as in formula [I]) said polyimide has amino groups and/or maleimide groups at the ends of the polyimide molecules.

11 Claims, 1 Drawing Sheet

MALEIMIDE COMPOSITION, PREPREG AND FIBER-REINFORCED PLASTIC

BACKGROUND OF THE INVENTION

I. Field of the Invention

This invention relates to a maleimide resin composition, as well as to a prepreg and a fiber-reinforced plastic prepared therefrom.

II. Description of the Related Art

Maleimide resin compositions are widely used in various industrial fields such as the fields of molded articles, laminated articles and adhesives by virtue of their excellent mechanical properties, chemical resistance and thermal resistance. In particular, maleimide resin compositions are widely used for fiber-reinforced composite materials containing reinforcing fibers and matrix resins as indispensable constituents. However, maleimide resin compositions have a drawback in that they are brittle, so that the cured materials thereof have low impact resistance. Especially, when a material is used as a structural material of aircraft, the low impact resistance is a serious problem.

To overcome this drawback of the maleimide resin compositions, various proposals have been made.

For example, it has been proposed to add a carboxy group-terminated butadiene-acrylonitrile rubber to the maleimide resin composition (International Adhesion and Adhesives, Vol. 5, No. 3 (1985)). However, by this method, although the toughness is promoted, the modulus of elasticity is largely decreased.

It has also been proposed to add to the maleimide resin polybenzimidazole particles (Abstract of 33rd International SAMPE Symposium); to add allylphenol having two benzene nuclei (U.S. Pat. No. 4,100,140; Japanese Patent Publication (Kokoku) No. 55-39242); to add an alkenyl-terminated aromatic oligomer (32nd International SAMPE Symposium; Japanese Laid-Open Patent Application (Kokai) No. 63-189410), or to add an aromatic oligomer such as polysulfone or polyetherketone (Japanese Laid-Open Patent Application (Kokai) No. 63-33423). However, with this methods, the improvement in the toughness is unsatisfactorily small.

Stenzenberger et al disclosed that the toughness is improved by adding a thermoplastic resin such as polyethersulfone, polyetherimide or polyhydantoin to the maleimide resin (Abstract of 33rd International SAMPE Symposium). However, with this method, although the toughness is improved, since the viscosity of the resin composition is increased by the addition of the thermoplastic resin, the moldability of the resin composition is largely reduced.

European Patent Publication No. 311,349 (1989) discloses to add an amine-terminated polyarylsulfone to the maleimide resin. The resulting maleimide resin composition gives a plastic having a homogeneous single phase structure; a plastic in which the polyarylsulfone phase and the maleimide resin phase are separated and both phases are continuous; or a plastic in which the polyarylsulfone constitutes a continuous phase and the maleimide constitutes dispersed phase, depending on the skeleton structure of the polyarylsulfone. It is also disclosed that the highest toughness is attained when both the polyarylsulfone phase and the maleimide resin phase are continuous. However, with this method, the thermal resistance of the maleimide resin is somewhat reduced.

Thus, in the prior art, the high toughness of the cured maleimide resin can only be attained at the sacrifice of elastic modulus, moldability or thermal resistance.

SUMMARY OF THE INVENTION

Accordingly, an object of the present invention is to provide a maleimide resin composition which gives a cured plastic having high toughness and high elastic modulus, as well as high thermal resistance, high thermal decomposition resistance, low water absorption and high solvent resistance. Another object of the present invention is to provide a prepreg and a fiber-reinforced plastic having the maleimide resin composition of the present invention as a matrix resin.

That is, the present invention provides a maleimide resin composition comprising:

a maleimide resin [A]; and a polyimide resin [B] containing a recurring unit of the formula [I] and/or [II]:

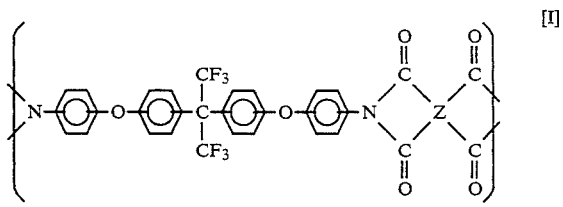

(wherein Z represents a tetracarboxylic acid dianhydride residue)

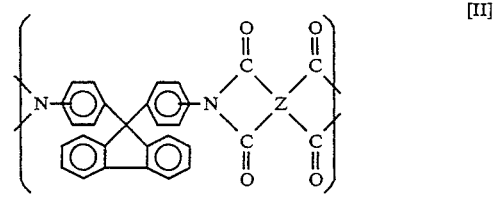

(wherein Z represents the same meaning as in formula [I]) said polyimide has amino groups and/or maleimide groups at the ends of the polyimide molecules.

The present invention also provides a prepreg comprising said maleimide resin composition of the present invention as a matrix resin and reinforcing fibers.

The present invention still also provides a fiber-reinforced plastic prepared by curing the prepreg of the present invention.

The maleimide resin composition of the present invention exhibits good processability when preparing a prepreg therefrom, and gives a cured plastic having high toughness, high elastic modulus, high thermal resistance, low water absorption and high solvent resistance, as well as high stabilities thereof. The prepreg comprising the resin composition of the present invention as a matrix resin has good tackiness and drapability. The reinforced composite material comprising the cured maleimide resin composition of the present invention has high toughness, high impact resistance, high strength, high elongation, high thermal resistance, low water absorption and high solvent resistance.

DETAILED DESCRIPTION OF THE PREFERRED EMBODIMENTS

Figure 1:
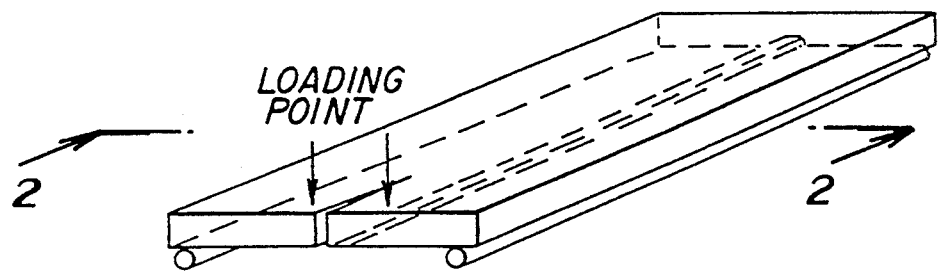
FIGS. 1-3 are views for explaining double torsion method for measuring the strain energy release rates of the cured resins.

As described above, the maleimide resin composition of the present invention comprises as a first element the maleimide resin [A]. The maleimide resin is a compound having not less than two maleimide groups in a molecule on average. The maleimide resin which may be employed in the present invention includes those represented by the formula [VI]:

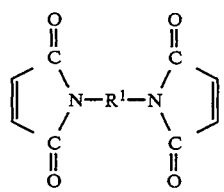

[VI]

(wherein $R^1$ represents a divalent hydrocarbon group such as $C_1$-$C_5$ alkylene group, $C_6$ to $C_{10}$ cycloalkylene group, monocyclic or polycyclic arylene group, or said divalent hydrocarbon groups bonded through a divalent group such as —$CH_2$—, —CO—, —$SO_2$—, —O—, —$C(CH_3)_2$— or —CONH—). The maleimide resin which may be employed in the present invention also includes the maleimide compounds obtained by reacting a mixed polyamine of the formula [VII]:

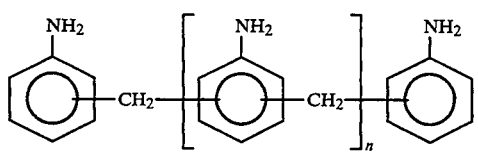

[VII]

(wherein n represents 0 or a positive number, preferably 0 to 2)
with maleic anhydride.

Specific examples of the preferred maleimide resin include N,N'-phenylenebismaleimide, N,N'-hexamethylenebismaleimide, N,N'-methylene-di-p-phenylenebismaleimide, N,N'-oxy-di-p-phenylenebismaleimide, N,N'-4,4'-benzophenonebismaleimide, N,N'-diphenylsulfonebismaleimide, N,N'-(3,3'-dimethyl)-methylene-di-p-phenylenebismaleimide, N,N'-4,4'-dicyclohexylmethanebismaleimide, N,N'-m(or p)-xylylenebismaleimide, N,N'-(3,3'-diethyl)-methylene-di-p-phenylenebismaleimide, N,N'-m-tolylene-di-maleimide and bis(aminophenoxy)benzenebismaleimide. The reaction products of a mixed polyamine and maleic anhydride may also preferably be used as the maleimide resin, which mixed polyamine is prepared by the reaction between aniline and formalin.

These maleimide compounds may be employed individually or in combination. Further, the maleimide resin may contain monomaleimide compounds such as N-allylmaleimide, N-propylmaleimide, N-hexylmaleimide and N-phenylmaleimide, in an amount of preferably 1 to 5 wt % with respect to the maleimide resin [A].

The maleimide resin may preferably be employed in combination with a reactive diluent. As the reactive diluent, the compounds having active groups which may react with maleimide group may be employed. The compounds having amino group, alkenyl group such as allyl group, benzocyclobutene group, allylnadicimide group, isocyanate group, cyanate group or epoxy group are preferred. A preferred example of the reactive diluent having amino group is diaminodiphenylmethane and preferred examples of the reactive diluent having alkenyl group include O,O'-diallylbisphenol A and bis(-propenyl phenoxy)sulfone.

Bismaleimide triazine resins (BT resins) prepared by the reaction between a bismaleimide and a cyanate of the formula [VIII]:

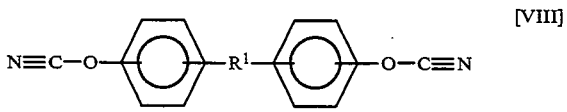

[VIII]

(wherein $R^1$ represents the same meaning as in formula [VI])
may also preferably be used as the maleimide resin [A]. This maleimide resin gives a cured resin having a low water absorption.

The maleimide resins conventionally used in this field may be employed in the present invention.

The maleimide resin [A] can be prepared according to conventional methods.

The maleimide resin composition of the present invention comprises as a second element the polyimide resin [B] containing a recurring unit of the above-described formula [I] and/or [II]. In the formulae [I] and [II], Z represents a tetracarboxylic acid dianhydride residue that means the moiety of tetracarboxylic acid dianhydride used for the preparation of the polyimide, from which the acid anhydride groups are removed. For example, if biphenyl tetracarboxylic acid dianhydride of the formula

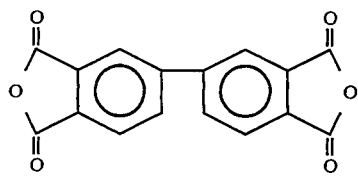

is used for the polycondensation with a polyamine so as to prepare the polyimide, the tetracarboxylic acid dianhydride residue Z is represented by the following formula.

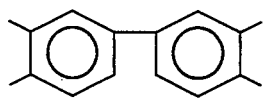

Preferred Z is represented by the formula [V]:

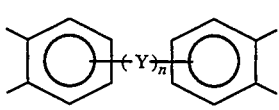

[V]

(wherein Y represents —CO—, —$SO_2$—, —O—, or —$C(M)_2$— (wherein M represents hydrogen atom, $C_1$-$C_5$ alkyl, allyl or $C_1$-$C_5$ haloalkyl), and n represents an integer of 0 or 1).

Those which are represented by the formulae [IX], IX] and [XI], respectively, are particularly preferred because high toughness of the cured resin may be attained.

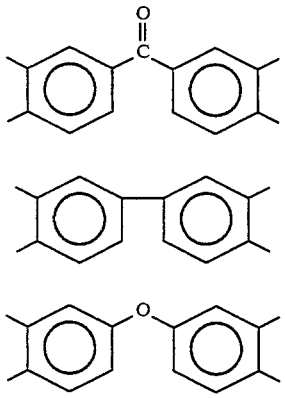

[IX]

[X]

[XI]

The polyimide resin [B] has amino groups and/or maleimide groups at the terminals of the polyimide molecules. By virtue of the amino groups or maleimide groups, the polyimide resin [B] can react with the maleimide resin [A]. If the polyimide resin does not have amino groups or maleimide groups at their terminals, the polyimide cannot react with the maleimide resin [A], so that the adhesiveness at the interface between the maleimide resin and the polyimide cannot be improved and so the toughness and solvent resistance of the cured resin cannot be promoted.

By virtue of the structure defined above, the polyimide resin [B] is soluble in the maleimide resin monomer or the above-described reactive diluent such as diallylbisphenol A before curing.

The solubility of the polyimide resin [B] in the maleimideresin [A] is surprisingly increased by the fact that the polyimide [B] contains the above-described structure of the formula [I] and/or [II]. The effect of this increasing of the solubility is attained if the polyimide resin [B] contains the diamine component giving the structure of the formula [I] and/or [II] in an amount of only 5 wt % of the total diamine components in the polyimide resin [B]. To increase the solubility while preventing the decrease in the toughness, the ratio of the copolymerized diamine component giving the structure of the formula [I] and/or [II] may preferably be 5–70% by weight of the total diamine components.

The polyimide resin [B] can be prepared by reacting a polyamine of the formula [XII] and/or [XIII]

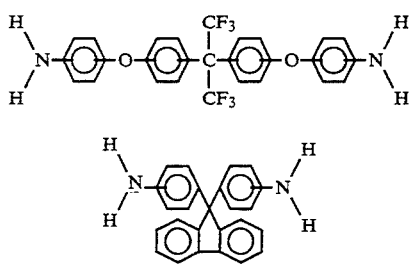

[XII]

[XIII]

with one or more tetracarboxylic acid dianhydrides, preferably those which give the tetracarboxylic acid dianhydride residue of the above-described formula [V], especially the above-described formula [IX], [X] or [XI]. The polycondensation process per se can be carried out according to the conventional process, and specific examples of the production of the polyimide resin [B] are presented later in the Examples. To increase the percentage of the polyimide molecules having amino groups at their ends, the diamine may be used in excess to the stoichiometric amount. The polyimide molecules having maleimide groups at their ends can be prepared by adding maleic anhydride in the polycondensation reaction system.

The polyimide resin [B] may contain other copolymerization components. Preferred diamines which may be copolymerized in the polyimide resin [B] are represented by the formula [XIV] or [XV]:

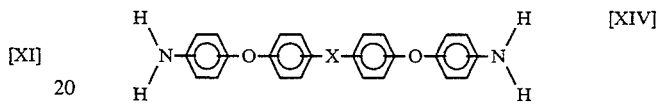

[XIV]

(wherein X represents —CO—, —SO$_2$—, —O—, —S— or —C(M)$_2$— (wherein M represents hydrogen atom, $C_1$-$C_5$ alkyl, allyl or $C_1$-$C_5$ haloalkyl))

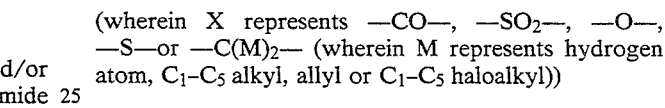

[XV]

(wherein X represents the same meaning as in formula [XIV]).

By copolymerizing these diamines in the polyimide resin [B], these diamines give the units represented by the formula [III] and [IV], respectively.

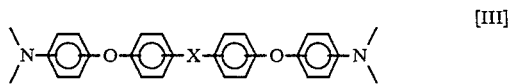

[III]

(wherein X represents the same meaning as in formula [XIV])

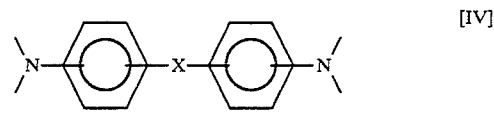

[IV]

(wherein X represents the same meaning as in formula [XIV]).

These diamines are preferred because the toughness of the cured resin may be promoted. This effect is especially prominent when the symbol X in the formulae [III] and [IV] (hence in the formulae [XIV] and [XV]) is —O—, —SO$_2$— or —C(CH$_3$)$_2$—.

Specific examples of the diamines represented by the formulae [XIV] and [XV] include those represented by the formulae [XVI] to [XXII]:

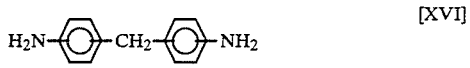

[XVI]

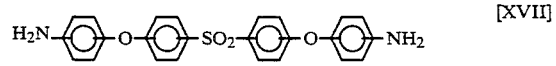

[XVII]

-continued

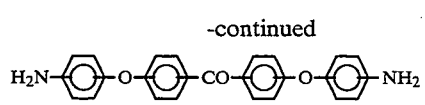 [XVIII]

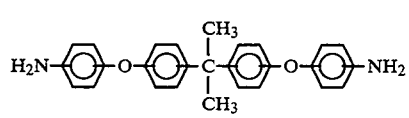 [XIX]

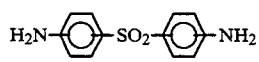 [XX]

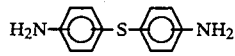 [XXI]

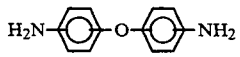 [XXII]

Although not included in those represented by the formulae [XIV] and [XV], the diamine represented by the formula [XXIII] may also preferably be employed as a copolymerization component.

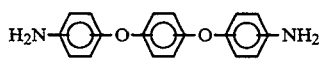 [XXIII]

The amount of the above-described diamine which may be copolymerized in the polyimide resin [B] may preferably be 100 to 2000% by weight with respect to the above-described diamines of the formulae [XII] and [XIII].

As for the tetracarboxylic acid dianhydride component, in addition to those which give the tetracarboxylic acid dianhydride residue represented by the above-described formula [IX], [X] or [XI], those represented by the formulae [XXIV] to [XXX] may also be employed.

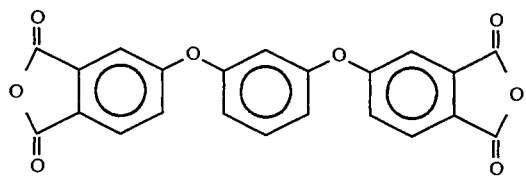 [XXIV]

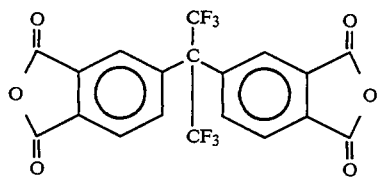 [XXV]

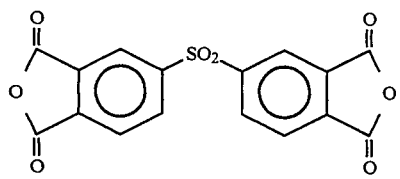 [XXVI]

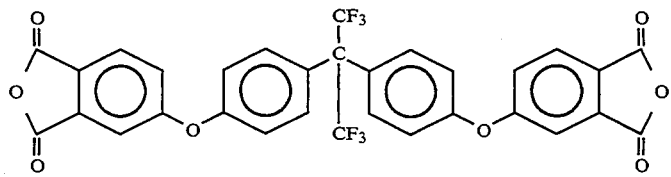 [XXVII]

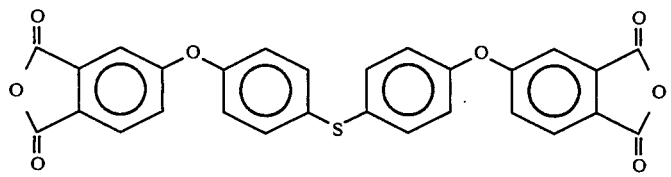 [XXVIII]

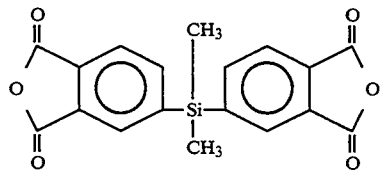 [XXIX]

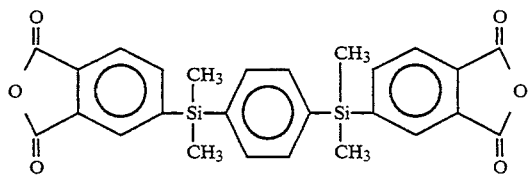

[XXX]

The amount of the polyimide resin [B] is preferably 5–40% by weight, more preferably 10–30% by weight of the total maleimide resin composition because within this range, the toughness of the cured resin maybe largely promoted while the increase in the viscosity of the resin and the reduction in the moldability may be made small, so that the coating of the resin and the impregnation of the resin when a prepreg is prepared may be easily carried out and the reduction in the processability of the prepreg may be prevented while not decreasing the tackiness and drapability.

The polyimide resin [B] preferably has a number average molecular weight of 2,000 to 20,000, more preferably 3,000 to 10,000 because within this range, the toughness of the cured resin may be largely promoted while the increase in the viscosity of the resin and the reduction in the moldability may be made small, so that the coating of the resin and the impregnation of the resin when a prepreg is prepared may be easily carried out and the reduction in the processability of the prepreg may be prevented while not decreasing the tackiness and drapability.

When preparing a resin for producing a prepreg by adding the polyimide resin [B] to the maleimide resin [A], the prepreg may be prepared after dissolving the polyimide resin [B] in the maleimide resin [A], or may be prepared after dispersing the particles of the polyimide resin [B] in the maleimide resin [A].

Polyimide resins have especially high thermal resistance and solvent resistance among the aromatic thermoplastic resins. Thus, by using the aromatic polyimide resin [B], the thermal resistance of the cured maleimide resin is not decreased. Moreover, if the thermal resistance of the polyimide resin [B] is higher than the maleimide resin [A], the overall thermal resistance of the cured resin is promoted. Further, the high elastic modulus and high solvent resistance which the maleimide resin [A] intrinsically has are not deteriorated by the polyimide resin [B].

In the cured resin composition, the polyimide [B] and the maleimide resin [A] are separated, and exhibit the micro-phase separated morphology.

More particularly, the cured resin has the microphase separated morphology in which a continuous phase (sea phase) constituted mainly by the polyimide resin [B] and a dispersed phase (island phase) constituted mainly by the maleimide resin [A]. By virtue of this morphology, the cured resin has high toughness which the conventional maleimide resins cannot attain.

The diameter of the dispersed phase (island phase) constituted mainly by the maleimide resin [A] may preferably be 0.01 to 50 μm, more preferably 0.1 to 10 μm because within this range, the depth of the irregularities on the broken surface is made sufficient so as to increase the energy-absorption effect, so that the high toughness is attained.

The cured resin prepared by curing the maleimide resin composition of the present invention has extremely high toughness, high thermal resistance, high thermal decomposition resistance, low water absorption and high solvent resistance. In particular, if the polyimide resin [B] has the structure represented by the formula [I], especially low water absorption intrinsic to the fluorine-contained compounds may be attained.

The present invention also provides a prepreg comprising the maleimide resin composition of the present invention as a matrix resin and reinforcing fibers, as well as fiber-reinforced plastic prepared by curing the prepreg.

The reinforcing fibers may preferably be those having high thermal resistance and high tensile strength, which are generally employed in the advanced composite materials. Preferred examples of the reinforcing fibers include carbon fibers, graphite fibers, aramide fibers, silicon carbide fibers, alumina fibers, boron fibers, tungsten carbide fibers and glass fibers. Among these, carbon fibers and graphite fibers are especially preferred because they have high specific strength and high specific elastic modulus, so that they contribute to the light weight of the fiber-reinforced plastic. Although any of these fibers may be employed depending on the use of the fiber-reinforced plastic, those having a tensile strength of not less than 450 kgf/mm$^2$ and having a tensile elongation of not less than 1.7% are especially preferred.

The reinforcing fibers may consist of one type of fibers or may be a mixture of a plurality of types of fibers. The shapes of the reinforcing fibers and their arrangement are not restricted at all. For example, the fibers may be arranged in a single direction or random directions, or in the form of a sheet, mat, cloth or braid. When the use of the fiber-reinforced plastic is one for which high specific strength and high elastic modulus are demanded, the fiber-reinforced plastics in which the fibers are arranged in one direction are suitable. For other uses, the fiber-reinforced plastics in which the fibers are arranged in the form of a cloth, which have good ease of handling, may preferably be employed.

In the fiber-reinforced plastic of the present invention, the optimum diameter of the dispersed phase mainly composed of the maleimide resin [A], which is thermodynamically stable, resides in a range smaller than the intervals of the reinforcing fibers. Thus, the optimum diameter of the dispersed phase may be 0.01 to 10 μm, especially 0.01 to 5 μm.

In the fiber-reinforced plastic of the present invention, as mentioned above, micro-phase separated morphology is attained. Further, surprisingly, most of the reinforcing fibers are enclosed by the dispersed phase mainly composed of the maleimide resin [A]. With this structure, the adhesiveness between the reinforcing fibers and the matrix resin is promoted.

The invention will now be described by way of specific examples thereof. The examples are presented for the illustration purpose only and should not be interpreted in any restrictive way.

Figure 2:
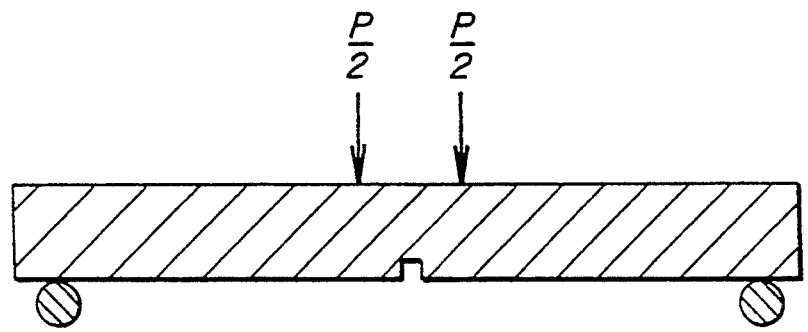
Figure 3:
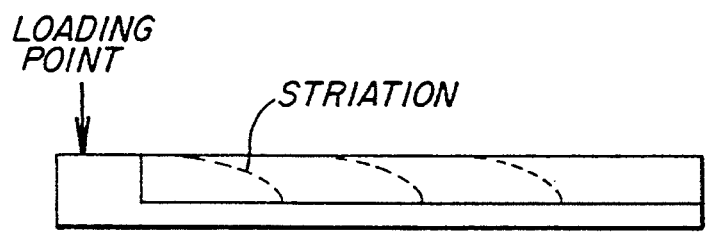

Before describing the examples, the method for measuring the strain energy release rate of the cured resin will now be described. The strain energy release rate $G_{IC}$ is measured by the double torsion (DT) method. The DT method is schematically shown in FIGS. 1–3. The details of the DT method is described in, for example, Journal of Materials Science, 20 (1985), pp.77–84. The $G_{IC}$ is calculated from the load P at which a crack generated, the gradient $(\Delta C/\Delta a_i)$ of compliance C to the distance of extended crack $a_i$, and sample thickness t of the crack-extended region according to the following equation:

$$G_{IC}=P^2(\Delta C/\Delta a_i)/2t$$

(wherein compliance C is defined by the equation $C=\delta/P$, wherein $\delta$ means the distance of the moving of the cross head when the crack generated). The velocity of the cross head by which the load is applied was 1 mm/min.

EXAMPLE 1

(1) Preparation of Polyimide Oligomer

In a 3000 ml separable flask equipped with a nitrogen inlet, thermometer, stirrer and a dehydration trap, 140 g (0.34 mol) of 2,2-bis[4-(4-aminophenoxy)phenyl]propane (BAPP) and 176 g (0.34 mol) of 2,2-bis[4-(4-aminophenoxy)phenyl]hexafluoropropane (HFBAPP) (commercially available from Wakayama Seika Kogyo, Co., Ltd., Japan] were dissolved in 1200 ml of N-methyl-2-pyrrolidone (NMP) with stirring under nitrogen atmosphere. To this mixture, 180 g (0.61 mol) of solid biphenyltetracarboxylic acid dianhydride (S-BPDA) (commercially available from Mitsubishi Chemical, Tokyo, Japan) was slowly added and the resulting mixture was stirred at room temperature for 3 hours. The mixture was then heated to 120° C. and stirred at this temperature for one hour. The mixture was then allowed to cool to room temperature and 50 ml of triethylamine and 50 ml of toluene were added to the mixture. The resulting mixture was then heated to 160° C. so as to carry out azeotropic dehydration, thereby obtaining about 22 ml of water. After cooling this reaction mixture, the mixture was diluted with twice volume of NMP and the resultant was slowly poured into 20 liters of acetone to precipitate amine-terminated polyimide oligomer as a solid product. The thus obtained precipitate was dried at 180° C. in vacuum. The number average molecular weight (Mn) of the oligomer was determined by gel permeation chromatography (GPC) using dimethylformamide (DMF) solvent, which was 4900 in terms of polyethylene glycol. The glass transition temperature of the polyimide oligomer determined by differential scanning calorimeter (DSC) was 239° C. Analysis of the polyimide oligomer by NMR spectrum revealed that the conversion rate to imide was about 95% and the percentage of the amine terminals was about 95%!.

(2) Preparation of Maleimide Resin Composition

In a beaker, 15.1 g of the imide oligomer prepared in (1) and 24.6 g of diallylbisphenol A were placed. The mixture was heated at 150° C. for one hour to dissolve the oligomer. Then 35.8 g of diaminodiphenylmethanebismaleimide was added to the mixture and dissolved in 15 minutes.

A vacuum pump was connected to the beaker and the mixture was defoamed in vacuum. The mixture was then poured into a mold having an inner size of 120 mm×120 mm×3 mm) preliminarily heated at 120° C., on which a releasing treatment was preliminarily performed. The mold was then placed in an oven and the resin composition was cured at 120° C. for 3 hours, 180° C. for 2 hours and then at 230° C. for 16 hours to obtain a cured resin plate with a thickness of 3 mm.

The glass transition temperature Tg of the thus obtained cured resin was 292° C. From this plate, the above-mentioned sample was cut out and the strain energy release rate $G_{IC}$ was measured, which was 610 J/m². The bending elastic modulus of the resin plate was 380 kg/mm². A resin plate sizing 60 mm×10 mm×3 mm was boiled for 20 hours and the water absorption was measured, which was 3.30%.

A polished surface of the cured resin was stained with osmic acid and its reflected electron image was observed with a scanning electron microscope. As a result, a micro-phase separated morphology was observed in which one phase had a continuous structure and spherical dispersed phase existed therein. The diameter of the dispersed phase was 1–6 μm. The same visual field was subjected to elementary analysis by using X-ray microanalyzer. As a result, fluorine atoms were densely distributed in the black continuous phase which had high contrast. Thus, it was revealed that the continuous phase is the polyimide-rich phase.

(3) Preparation of Prepreg

The resin composition having the composition described above was kneaded by a kneader and coated to a constant thickness on a releasing paper preliminarily coated with a silicone-based releasing agent. Carbon fibers (Torayca T800H, trademark, commercially available from Toray Industries, Inc., Tokyo, Japan) were aligned in one direction and sandwiched between a pair of the thus coated papers to obtain a prepreg. The weight ratio of the resin in the prepreg was 35% and the weight of the carbon fibers was 145 g/m². Thirty two plies of the thus prepared prepreg were laminated quasi-isotropically ((+45°/90°/−45°/0°)4s). The resultant was heated at 180° C. for 2 hours under a pressure of 6 kg/cm² by an ordinary bag autoclave molding method and then subjected to after cure at 230° C. for 16 hours to obtain a cured plate. The volume of the fibers in the thus prepared fiber-reinforced plastic was 56±2%. A sample sizing 4"×6" was cut out and an impact energy of 1500 in.lb/in was given to the sample. Thereafter, a compression test was carried out. As a result, the fiber-reinforced plastic showed a residual compression strength of 41 ksi. On the other hand, 16 plies of the prepreg obtained above were laminated in the same direction and a cured plate was prepared therefrom in the same manner as described above. The 90° tensile elongation of this cured plate was measured, which was 1.3%. A polished surface of the thus obtained carbon fiber-reinforced plastic was stained with osmic acid and the reflected electron image thereof was observed with a scanning electron microscope. As a result, the morphology similar to that observed in the cured resin (containing no fibers) was observed. Further, it was observed that at the interfaces between the carbon fibers and the resin, the maleimide resin phase was unevenly located at the interfaces between the carbon fibers and the resin, and the high contrast phase (imide oligomer phase) densely distributed with fluorine atoms scarcely contacted the carbon fibers.

EXAMPLE 2

In a beaker, 15.1 g of the polyimide oligomer prepared in Example 1 and 24.6 g of diallylbisphenol A were placed, and the resulting mixture was heated at 150° C. for 1 hour to dissolve the polyimide oligomer. Then 28.6 g of diaminodiphenylmethanebismaleimide and 7.2 g of m-phenylenebismaleimide were added to the mixture and dissolved in 15 minutes.

A vacuum pump was connected to the beaker and the mixture was defoamed in vacuum. The mixture was then poured into a mold having an inner size of 120 mm×120 mm×3 mm) preliminarily heated at 120° C., on which a releasing treatment was preliminarily performed. The mold was then placed in an oven and the resin composition was cured at 130° C. for 2 hours, 180° C. for 2 hours and then at 230° C. for 16 hours to obtain a cured resin plate with a thickness of 3 mm.

The glass transition temperature Tg of the thus obtained cured resin was 296° C. From this plate, the above-mentioned sample was cut out and the strain energy release rate $G_{IC}$ was measured, which was 560 J/m$^2$. The bending elastic modulus of the resin plate was 400 kg/mm$^2$. A resin plate sizing 60 mm×10 mm×2 mm was boiled for 20 hours and the water absorption was measured, which was 3.40%.

A polished surface of the cured resin was stained with osmic acid and its reflected electron image was observed with a scanning electron microscope. As a result, a micro-phase separated morphology was observed in which one phase had a continuous structure and spherical dispersed phase existed therein.

EXAMPLE 3

(1) Preparation of Polyimide Oligomer

In 1200 ml Of N-methyl-2-pyrrolidone (NMP), 276 g (0,673 mol) of 2,2-bis[4-(4-aminophenoxy)phenyl]propane (BAPP) and 157 g (0,449 mol) of 9,9-bis(4-aminophenyl)fluorene (FDA) (commercially available from Wakayama Seika Kogyo, Co., Ltd., Japan) as diamines were dissolved under stirring. To this solution, 300 g (1.02 mol) of solid biphenyltetracarboxylic acid dianhydride (S-BPDA)(commercially available from Mitsubishi Chemical, Tokyo, Japan) was slowly added and the resulting mixture was stirred at room temperature for 3 hours. To the resultant, 20.1 g (0,205 mol) of maleic anhydride was added and the resulting mixture was stirred for 2 hours. Then 50 ml of triethylamine and 50 ml of toluene were added. The resulting mixture was then heated to 160° C. so as to carry out azeotropic dehydration, thereby obtaining about 22 ml of water. After cooling this reaction mixture, the mixture was diluted with twice volume of NMP and the resultant was slowly poured into 20 liters of acetone to precipitate maleimide-terminated polyimide oligomer as a solid product. The thus obtained precipitate was dried at 180° C. in vacuum. The number average molecular weight (Mn) of the oligomer was determined by gel permeation chromatography (GPC) using dimethylformamide (DMF) solvent, which was 5200 in terms of polyethylene glycol. The glass transition temperature of the polyimide oligomer determined by differential scanning calorimeter (DSC) was 310° C. Analysis of the polyimide oligomer by NMR spectrum revealed that the conversion rate to imide was about 94% and the percentage of the maleimide terminals were about 90%.

(2) Preparation of Maleimide Resin Composition

In a beaker, 15.1 g of the imide oligomer prepared in (1) and 24.6 g of diallylbisphenol A were placed. The mixture was heated at 150° C. for one hour to dissolve the oligomer. Then 35.8 g of diaminodiphenylmethanebismaleimide was added to the mixture and dissolved in 15 minutes.

A vacuum pump was connected to the beaker and the mixture was defoamed in vacuum. The mixture was then poured into a mold having an inner size of 120 mm×120 mm×3 mm) preliminarily heated at 120° C., on which a releasing treatment was preliminarily performed. The mold was then placed in an oven and the resin composition was cured at 120° C. for 3 hours, 180° C. for 2 hours and then at 230° C. for 16 hours to obtain a cured resin plate with a thickness of 3 mm.

The glass transition temperature Tg of the thus obtained cured resin was 301° C. From this plate, the above-mentioned sample was cut out and the strain energy release rate $G_{IC}$ was measured, which was 550 J/m$^2$. The bending elastic modulus of the resin plate was 380 kg/mm$^2$. A resin plate sizing 60 mm×10 mm×3 mm was boiled for 20 hours and the water absorption was measured, which was 3.50%.

A reflected electron image of rupture cross-section of the cured resin was observed with a scanning electron microscope. As a result, a spherical dispersed phage with a diameter of 1-5 μm was observed.

COMPARATIVE EXAMPLE 1

(1) Preparation of Polyimide Oligomer

In a 3000 ml separable flask equipped with a nitrogen inlet, thermometer, stirrer and a dehydration trap, 280 g (0.68 mol) of 2,2-bis[4-(4-aminophenoxy)phenyl]propane (BAPP) was dissolved in 1200 ml of N-methyl-2-pyrrolidone (NMP) with stirring under nitrogen atmosphere. To this flask, 180 g (0.61 mol) of solid biphenyltetracarboxylic acid dianhydride (S-BPDA) (commercially available from Mitsubishi Chemical, Tokyo, Japan) was slowly added and the resulting mixture was stirred at room temperature for 3 hours. The mixture was then heated to 120° C. and stirred at this temperature for one hour. The mixture was then allowed to cool to room temperature and 50 ml of triethylamine and 50 ml of toluene were added to the mixture. The resulting mixture was then heated to 160° C. so as to carry out azeotropic dehydration, thereby obtaining about 21 ml of water. However, in this process, the polyimide oligomer precipitated. After cooling, this reaction product was poured into 20 liters of acetone to wash the same. The oligomer was then transferred to 10 liters of water and washed with boiling, followed by drying in vacuum at 180° C. The glass transition temperature of the thus obtained oligomer was measured by a differential scanning calorimeter (DSC), which was 240° C.

(2) Preparation of Maleimide Resin Composition

In a beaker, 15.1 g of the thus obtained polyimide oligomer and 24.6 g of diallylbisphenol A were added. The mixture was then heated at 150° C. for 2 hours. However, the oligomer was not dissolved in diallylbisphenol A.

COMPARATIVE EXAMPLE 2

The same procedure as in Example 1 was repeated except that the imide oligomer [B] was not added to prepare a cured maleimide resin plate. The glass transition temperature of the obtained cured resin was 294° C. The strain energy release rate $G_{IC}$ was measured, which was 100 J/m$^2$. The bending elastic modulus of the resin plate was 380 kg/mm$^2$, and the water absorption after boiling for 20 hours was 4.12%.

A prepreg was prepared in the same manner as in Example 1 using the thus obtained maleimide resin as a matrix resin. The content of the resin in the prepreg was 35% by weight, and the weight of the prepreg was 145 g/m². Thirty two plies of the thus prepared prepreg were laminated quasi-isotropically ((+45°/90°/−45°/0°)4s). The resultant was heated at 180° C. for 2 hours under a pressure of 6 kg/cm² by an ordinary bag autoclave molding method to obtain a cured plate. The volume of the fibers in the thus prepared fiber-reinforced plastic was 56±2%. A sample sizing 4"×6" was cut out and an impact energy of 1500 in.lb/in was given to the sample. Thereafter, a compression test was carried out. As a result, the fiber-reinforced plastic showed a residual compression strength of 21.5 ksi. On the other hand, 16 plies of the prepreg obtained above were laminated in the same direction and a cured plate was prepared therefrom in the same manner as described above. The 90° tensile elongation of this cured plate was measured, which was 0.7%.

COMPARATIVE EXAMPLE 3

The same procedure as in Example 2 was repeated except that the polyimide resin [B] was not added to prepare a maleimide resin plate. The glass transition temperature Tg of the thus obtained cured resin was 296° C. The strain energy release rate $G_{IC}$ was measured, which was 90 J/m². The bending elastic modulus of the resin plate was 395 kg/mm², and the water absorption after boiling for 20 hours was 4.2%.

Although the invention was described by way of specific preferred embodiment thereof, it is apparent for those skilled in the art that various modifications may be made within the spirit and scope of the present invention.

We claim:

1. A maleimide resin composition comprising:
   a maleimide resin (A);
   a polyimide resin (B) containing recurring units of the formula (I) and (II) or containing a recurring unit of the formula (II):

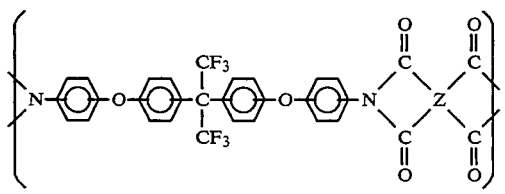
(I)

wherein Z represents a tetracarboxylic acid dianhydride residue

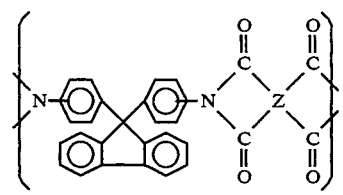
(II)

wherein Z has the same meaning as in formula (I), said polyimide has amino groups at the ends of the polyimide molecules; and an aromatic allyl compound (C) as a reactive diluent of said maleimide resin (A).

2. The maleimide resin composition of claim 1, wherein said polyimide resin (B) contains as a copolymerization component the amine unit represented by the formula (III) and/or (IV)

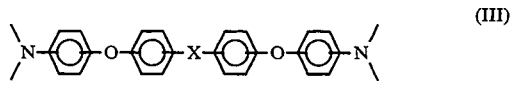
(III)

wherein X represents —CO—, —SO₂—, —O—, —S— or —C(M)₂—, wherein M represents a hydrogen atom, a C₁-C₅ alkyl, an allyl or a C₁-C₅ haloalkyl

(IV)

wherein X has the same meaning as in formula (III), provided that X does not represent a ditrifluoromethylmethylene group.

3. The maleimide resin composition of claim 1, wherein said tetracarboxylic acid dianhydride residue represented by the symbol Z is represented by the formula (V)

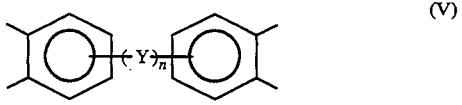
(V)

wherein Y represents —CO—, —SO₂—, —O—, or —C(M)₂— wherein M represents hydrogen atom, C₁-C₅ alkyl, allyl or C₁-C₅ haloalkyl, and n represents an integer of 0 or 1.

4. The maleimide resin composition of claim 1, wherein said maleimide resin (A) comprises diaminodiphenylmethanebismaleimide and/or m-phenylenebismaleimide.

5. The maleimide resin composition of claim 1, wherein the content of said polyimide resin (B) is 5–40% by weight of said maleimide resin composition.

6. The maleimide resin composition of claim 5, wherein said polyimide resin (B) has a number average molecular weight of 2,000 to 20,000.

7. A prepreg comprising said maleimide resin composition of any one of claims 1, 2, 3, 4, 5, or 6 and reinforcing fibers.

8. The prepreg of claim 7, wherein said reinforcing fibers are carbon fibers and/or graphite fibers.

9. A fiber-reinforced plastic prepared by curing said prepreg of claim 7.

10. The fiber-reinforced plastic of claim 9, wherein said polyimide resin (B) constitutes a three-dimensionally continuous phase in said cured maleimide resin composition.

11. A fiber-reinforced plastic obtained by curing said prepreg of claim 8.

* * * * *